United States Patent Office 3,655,684
Patented Apr. 11, 1972

3,655,684
NOVEL SUBSTITUTED-OXADIAZOLES AND A PROCESS FOR THE MANUFACTURE THEREOF
John Mervyn Osbond, Hatfield, and Peter George Philpott, Welwyn Garden City, England, assignors to Hoffmann-La Roche Inc., Nutley, N.J.
No Drawing. Filed Aug. 27, 1969, Ser. No. 853,510
Claims priority, application Great Britain, Sept. 19, 1968, 44,525/68
Int. Cl. C07d 85/52
U.S. Cl. 260—307 G      8 Claims

ABSTRACT OF THE DISCLOSURE

3-[2-(R—CO—N) - ethyl] - 5 - (phenyl)-1,2,4-oxadiazoles and processes. Such compounds are useful as anticonvulsant agents.

DETAILED SUMMARY OF THE INVENTION

The present invention relates to substituted-oxadiazoles of the formula

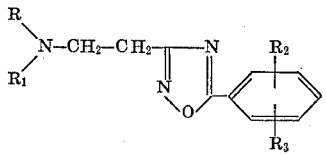

I wherein R is selected from the group consisting of lower alkyl, lower alkenyl and hydrogen, $R_1$ represents lower alkanoyl, halo-lower alkanoyl, di-halo-lower alkanoyl or aminocarbonyl and $R_2$ and $R_3$ are each selected from the group consisting of hydrogen, halogen, nitro, lower alkyl, lower alkoxy and di(lower alkyl)amino.

By the term "lower alkyl" as utilized herein, there is intended both straight and branched chain hydrocarbon radicals containing 1 to 7, preferably 1 to 4 carbon atoms. Representative of such are methyl, ethyl, propyl, isopropyl, butyl and tertiary butyl. The term "lower alkenyl" similarly is intended to designate both straight and branched chain hydrocarbon groups containing a single ethylenic bond and 1 to 7, preferably 1 to 4 carbon atoms, e.g., allyl. Halogen connotes all four forms thereof, e.g., chlorine, bromine, fluorine or iodine. The term "lower alkanoyl" utilized herein is intended to connote the acyl (RC=O) moiety of a straight or branched chain lower alkanoic acid containing from 1 to 6, preferably 1 to 4 carbon atoms in the hydrocarbon portion (R) of the acyl moiety. Illustrative of acyl moieties encompassed by the term "lower alkanoyl" are acetyl, propionyl, butyryl and isovaleroyl. The term "lower alkoxy" as utilized herein connotes both straight or branched chain hydrocarbonoxy groups containing from 1 to 7 carbon atoms, preferably 1 to 4 carbon atoms in the chain, such as methoxy, ethoxy, propoxy, isopropoxy, butoxy and the like.

Preferred are compounds of the Formula I wherein R represents lower alkyl and lower alkenyl, $R_2$ is hydrogen and $R_3$ is hydrogen or halogen. Thus, a particularly preferred class of compounds encompassed by the genus of the Formula I are of the formula

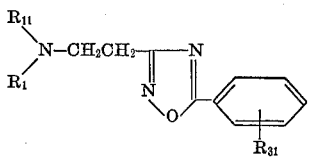

Ia wherein $R_1$ is as above, $R_{11}$ represents lower alkyl or lower alkenyl and $R_{31}$ represents hydrogen or halogen.

Most preferred are compounds of the Formula Ia above wherein $R_{11}$ is lower alkyl, most preferentially, methyl or ethyl. Also when $R_{31}$ is halogen, preferred among the halogens is chlorine. Of special interest are 3-[2-(N-lower alkylacetamino)ethyl]-5-(halophenyl)-1,2,4 - oxadiazoles and particularly a compound included within this subgenus of the formula 3-[2-(N-methylactamido)ethyl]-5-(m-chlorophenyl)-1,2,4-oxadiazole.

Compounds of the Formula I wherein $R_1$ represents lower alkanoyl can be prepared by treating a nitrile of the formula

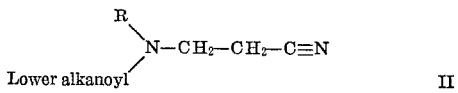

II wherein R has the significance ascribed thereto hereinabove, with hydroxylamine whereby to prepare an amidoxime of the formula

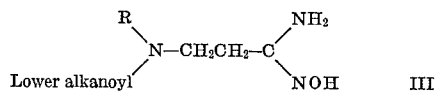

III wherein R has the same meaning as ascribed thereto hereinabove. The so-obtained amidoxime is then treated with an acyl halide of the formula

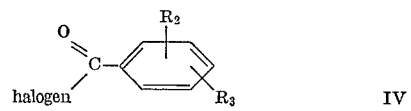

IV wherein $R_2$ and $R_3$ have the same meaning as above, whereby a compound of the Formula I wherein $R_1$ is lower alkanoyl is obtained. Compounds of the Formula III above are novel compounds and hence constitute a part of the present invention.

The so-obtained compound of the Formula I above which contains a lower alkanoyl group at $R_1$ can be hydrolyzed to the corresponding compound of the Formula I wherein $R_1$ is hydrogen. The resulting compound can be converted into the corresponding compound wherein $R_1$ is halo-lower alkanoyl, dihalo-lower alkanoyl and aminocarbonyl in the manner described hereiafter.

The compound of the Formula II wherein R represents lower alkyl or lower alknenyl can be prepared by cyanoethylating the corresponding lower alkyl or lower alkenylamine (utilizing acrylonitrile) and thereafter introducing the lower alkanoyl radical into the resulting 3-(N)-(lower alkyl or lower alkenyl) propionitrile by conventional lower alkanoylating techniques. The compound of the Formula II wherein R is hydrogen can be prepared by reacting the corresponding lower alkanoic acid amide with acrylonitrile in the presence of a catalytic amount of an alkali metal lower alkoxide such as sodium methoxide.

In preparing the starting materials of the Formula II above, the presence of alkaline catalyst may be required. However, certain amines such as methylamine and ethylamine are sufficiently basic to catalyze their own cyanoethylations. Thus, when such type amines are utilized, they can conveniently serve as both the solvent medium and as the basic catalyst.

The conversion of a compound of the Formula II into the corresponding compound of the Formula III with hydroxylamine is preferably carried out under anhydrous conditions in the presence of an inert organic solvent. A suitable inert organic solvent for this purpose is a lower alkanol such as methanol. The reaction of hydroxylamine with a compound of the Formula II is conveniently carried out at elevated temperatures, most preferably at about the reflux temperatures of the reaction medium.

Conveniently, the hydroxylamine is formed in situ, by adding a solution of an acid addition salt of hydroxylamine, e.g., hydroxylamine hydrohalides such as hydroxylamine hydrochloride in an inert organic solvent such as methanol, to the nitrile of the Formula II. The resulting medium is then treated with a base such as an alkali metal lower alkoxide, e.g., sodium ethoxide. By proceeding accordingly, there can be obtained the corresponding compound of the Formula III above.

The conversion of an amidoxime of the Formula III to the corresponding compound of the Formula I with an acid halide, e.g., acid chloride, of the Formula IV above is preferably carried out in the presence of a weakly basic substance. The basic substance functions as an acceptor for the hydrogen halide which is liberated during the reaction. Basic nitrogen-containing heterocyclics such as pyridine, lutidenes, collidines, quinoline and isoquinoline are representative of useful weak basic substances suitable for the purposes of this process step. In a preferred aspect, such basic nitrogen-containing heterocyclics are utilized in excessive amounts so that they also can serve as the medium in which the reaction is effected. Thus, by the convenient approach of providing the weak base in excessive amounts, there is provided to the reaction zone, both a substance which serves both as the acid acceptor and the solvent medium in which the reaction may be effected.

In an alternate less preferred process embodiment, the amidoxime of the Formula III and the benzoyl halide of the Formula IV can be added to inert organic solvent such as an aromatic hydrocarbon, e.g., toluene, and a weak base of the type illustrated more completely hereinabove is then added to the resulting solution. In either process embodiment, i.e., utilizing the basic substance as the solvent medium or the inert organic solvent as the solvent medium, the reaction is suitably carried out at about elevated temperatures, preferably, at about or near the reflux temperature of the reaction medium.

The reaction proceeds through an intermediate ester of the formula

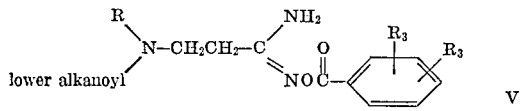

wherein R, $R_2$ and $R_3$ have the same meaning as described hereinabove.

The intermediate ester can be converted to the desired compound of the Formula I above with or without isolation from the reaction medium in which it is prepared.

The said intermediate of the Formula V may be isolated if the reaction conditions are carefully controlled, e.g., if the reaction conditions are maintained such that they do not become too energetic. However, the ester of the Formula V above can be cyclized to the desired compounds of the Formula I above with or without isolation from the reaction medium in which they are prepared. In a preferred embodiment, they are cyclized to the desired compound of the Formula I without isolation.

The reaction of the amidoxime of the Formula III with an acid halide of the Formula IV yields the corresponding oxadiazole of the formula I wherein $R_1$ is lower alkanoyl. Such substituted oxadiazole can be hydrolyzed to yield a compound of the formula

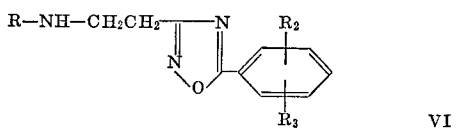

wherein R, $R_2$ and $R_3$ are as above or an acid addition salt thereof.

The resulting compound of the Formula VI can then be treated with an agent capable of providing a halo-lower alkanoyl moiety, a dihalo-lower alkanoyl moiety or amino-carbonyl moiety to yield the corresponding compound of the Formula I wherein $R_1$ represents halo-lower alkanoyl, dihalo-lower alkanoyl or an aminocarbanoyl group.

The hydrolysis of a compound of Formula I wherein $R_1$ represents a lower alkanoyl group to prepare the corresponding compound of the Formula VI above, can be carried out utilizing a dilute mineral acid, e.g., a dilute hydrohalide acid such as dilute hydrochloric acid. The hyrolysis proceeds efficaciously when performed at elevated temperatures, for example, at a temperature of about 100° C.

The reaction of a halo lower alkanoyl group-providing agent or a dihalo loweralkanoyl group-providing agent with a compound of the Formula VI or an acid addition salt thereof can be effected utilizing any conveniently available appropriate agent suitable for this purpose such as, for example, dichloroacetyl chloride, chloroacetyl chloride, 3-chloropropionyl chloride, 3-bromoacetyl bromide and the like. Suitably, this process aspect is effected in the presence of a basic catalyst such as an alkali metal hydroxide, e.g., sodium hydroxide, preferably at a temperature from about 0° to about 30° C., most preferably at a temperature from about 0° C. to about below room temperature.

The carbamoylation of a compounds of the Formula VI above or an addition salt thereof to prepare the corresponding compound of the Formula I wherein $R_1$ is carbamoyl is effected by heating an acid addition salt of a compound of the Formula VI above with an alkali metal cyanate, e.g., potassium cyanate or by reacting a compound of the Formula VI above with phosgene, preferably in the presence of a base such as, for example, pyridine and treating the resulting chlorocarbonate with ammonia, conveniently in the presence of an inert organic solvent such as ether.

It is, of course, to be understood that a lower alkanoyl group can be reintroduced into a compound of the Formula VI by conventional acylation methods. Accordingly, a compound of the Formula I above wherein $R_1$ represents the lower alkanoyl group, acetyl can be deacetylated to obtain the corresponding compound of the Formula VI and the resulting compound can be treated wtih propionyl chloride, butyryl chloride and the like to obtain the compound which possess the corresponding lower alkanoyl group at $R_1$. Similarly, other acyl interchanges can be effected.

A particularly preferred process aspect leading to a preferred class of substituted oxadiazole mentioned earlier involves treating a nitrile starting material of the Formula II in which R represents lower alkyl, most preferentially, the methyl or ethyl lower alkyl radicals, with hydroxylamine, reacting the resulting amidoxime of the Formula III with an acid halide of the Formula IV above wherein $R_2$ represents hydrogen and $R_3$ represents a hydrogen or halogen atom, most preferentially a chlorine atom. An especially interesting embodiment of this process aspect comprising treating 3-(N-lower alkylacetamido) propionitrile with hydroxylamine and reacting the so-formed 3 - (N - lower alkylacetamido)propionamidoxime with m-halobenzoyl halide. Especially useful is the process aspect which comprises treating 3-(N-methylacetamido)propionitrile with hydroxylamine and reacting the so-formed 3-(N-methylacetamido)propionamidoxime with m-chlorobenzoyl chloride.

The novel oxadiazole derivatives provided by the invention have anticonvulsant activity and are useful as anticonvulsant agents. For example, 3-[2-(N-methylacetamido)ethyl]-5-(m-chlorophenyl)-1,2,4-oxadiazole, which has an $LD_{50}$ of 1230 mg./kg. per os in mice, exhibits anticonvulsant activity in the antimetrazole test with an $ED_{50}$ of 165 mg./kg. per os in mice, in the maximal electroshock assay wtih a $PD_{50}$ of 45 mg./kg. per os in mice, in the minimal electroshock assay with a $PD_{50}$ of 40 mg./kg. per os in mice and in a further electroshock test with an $ED_{50}$ of 34 mg./kg. per os in cats. 5,5-diphenyl-hydantoin, a well-known anticonvulsant, which has an $LD_{50}$ of 580 mg./kg. per os in mice, has an $ED_{50}$ of more than 150 mg./kg. per os in mice in the antimetrazole test, a $PD_{50}$ of 5 mg./kg. per os in mice in the maximal electroshock assay, a $PD_{50}$ of 7 mg./kg. per os in mice in the minimal electroshock assay and an $ED_{50}$ of 15 mg./kg. per os in cats in the further electroshock test.

The antimetrazole test involves administering the particular substance to be tested per os in different dosages to groups of test animals and 4 hours later injecting the animals intraperitoneally with metrazole (1,5-pentamethylene-tetrazole) in a dosage which causes fatal convulsions in all untreated test animals. The $ED_{50}$ of the substance being tested, i.e., that dosage which protects 50% of the animals from metrazole-induced fatal convulsions, is determined from the number of survivors in each group of test animals.

The maximal electroshock assay mentioned earlier involves applying an alternating current (50 cycles per second, maximum 400 volts) of 10 milliamperes to the test animals for 0.2 second by means of corneal electrodes, repeating the experiment after 48 hours, excluding animals in which no unequivocal shock is induced, dividing the remainder into groups and, 48 hours later, repeating the experiment, but in this case administering the particular substance being tested per os in various dosages 1 hour before the current is applied. The $PD_{50}$ of the substance being tested, i.e., that dosage which protects 50% of the test animals from the electroshock, is determined from the number of animals protected from electroshock in each group. The manner of conducting the minimal electroshock assay is identical with the manner the maximal electroshock assay is conducted, except that an alternating current of 5.5 milliamperes is used. The further electroshock test mentioned earlier involves determining that dosage of the particular substance being tested which, when administered per os 4 hours before carrying out the experiment, is necessary in order to increase by 50% the alternating current applied bicorneally to the test animal for 2 seconds which is required to induce a maximal convulsion which outlasts the stimulus, and expressing said dosages as $ED_{50}$.

Compounds of the Formula I (and, of course, Ia) provided by this invention can be compounded into conventional pharmacological preparations with pharmaceutical carriers. The compounds can be administered enterally or parenterally in conventional dosage forms, such as tablets, powders, capsules and granulates, the carrier being inorganic, e.g., talc, or organic, e.g., lactose or corn starch. Additives such as magnesium stearate (a lubricant) may also be present. Liquid preparations for oral administration include emulsions, solutions, and suspensions. Diluents commonly used in pharmacy, e.g., water and petroleum jelly, may be present in such liquid preparations. The liquid preparations may take the form of sterile aqueous or non-aqueous solutions, suspensions or emulsions. Polyoxyethylene glycols and vegetable oils are useful suspending media. Emulsifying agents, dispersing agents and other adjuvants may also be present.

The frequency with which any of the aforementioned dosage forms will be administered will depend upon the quantity of active substituted-oxadiazole present therein and the exigencies of the pharmacological situation. However, under ordinary circumstances, from 50 mg. to 200 mg. can be administered daily in one or several doses, depending upon the pharmacological situation.

The following examples are representative of the present invention and serve to supplement the foregoing disclosure of the invention with additional descriptions of the manner of carrying out the invention. All temperatures are given in degrees centigrade.

EXAMPLE 1

A stirred solution of 477 g. of 3-(N-methylacetamido)-propionamidoxime in 1500 ml. of dry pyridine was treated at 0°–5° C. (cooling with an ice/salt bath) with 525 g. of m-chlorobenzoyl chloride. The resulting mixture was allowed to warm to room temperature, then heated under reflux for 2.5 hours and poured into 3 liters of water. The mixture thus obtained was evaporated under reduced pressure until all of the pyridine had been removed and the residue (ca 1.5 liters) was extracted with one 500 ml. portion and two 250 ml. portions of chloroform. The combined extracts were washed with 250 ml. of aqueous 2N hydrochloric acid and 500 ml. of aqueous 1 N sodium carbonate solution, dried over magnesium sulphate and evaporated under reduced pressure. The residual oil was allowed to crystallize slowly from a warm, stirred mixture of 2 liters of benzene and 2 liters of light petroleum (boiling range=60°–80°). The two crops of crystals obtained were dried in vacuo at 30°–35° C. to give 3-[2-(N - methylacetamido)ethyl] - 5 - (m-chlorophenyl) - 1, 2,4-oxadiazole of melting point 80°–81° C. After recrystallization from benzene/[light petroleum (boiling range =60°–80° C.)], with the addition of charcoal, the melting point was found to be 82°–83.5° C.

The 3-(N-methylacetamido)-propionamidoxime used as starting material can be prepared as follows:

99 g. of 3-(N-methylacetamido)-propionitrile were added to a solution of 69.5 g. of hydroxylamine hydrochloride in 800 ml. of dry methanol. The resulting clear solution was treated with a sodium methoxide solution obtained from 23 g. of sodium and 800 ml. of dry methanol, then stirred and heated under reflux for 16 hours. After chilling, the suspension obtained was filtered and the filtrate was evaporated. The residue was dissolved in 500 ml. of hot ethanol and the solution obtained was filtered, evaporated under reduced pressure to a small volume and left to crystallize, additional crops of crystals being obtained by cautious addition of benzene to the mother liquors. 3-(N-methylacetamido)-propionamidoxime of melting point 115°–118° C. was obtained.

EXAMPLE 2

3 - (N - methylacetamido) - propionamidoxime was reacted with benzoyl chloride in the manner described in Example 1 to yield 3-[2-(N-methylacetamido)ethyl]-5-phenyl-1,2,4-oxadiazole of boiling point 147° C./0.02 mm. and melting point 78°–79° C.

A suspension of 12.25 g. of 3-[2-(N-methylacetamido) ethyl[-5-phenyl-1,2,4-oxadiazole in 100 ml. of 3 N aqueous hydrochloric acid was stirred at 100° for 16 hours. The suspension was then evaporated to dryness under reduced pressure and subsequently re-evaporated twice with 50 ml. of ethanol each time. The residue obtained was suspended in 100 ml. of ethyl acetate, filtered off, washed with ethyl acetate and crystallized from ethanol to give 3 - (2 - methylaminoethyl) - 5 - phenyl - 1,2,4-oxadiazole hydrochloride of melting point 168°–171°.

6.0 g. of 3-(2-methylaminoethyl)-5-phenyl-1,2,4-oxadiazole hydrochloride and 2.025 g. of potassium cyanate in 10 ml. of water were heated at 100° in an open dish. The initially clear solution soon became cloudy and an oil separated. Heating was continued, with occasional stirring, until all the water had evaporated. The residue was extracted three times with boiling ethanol under reflux conditions for 0.5 hour, 100 ml. of ethanol being used each time. The combined extracts were evaporated and the solid residue was suspended in ether, then filtered off, washed with ether and dried to yield 3-[2-(N-carbamoyl-N-methylamino)ethyl[-5-phenyl-1,2,4-oxadiazole of melting point 121°–124° C. Recrystallization from water or from benzene/ethanol gave colorless rhombohedra of melting point 123°–125° C.

EXAMPLE 3

12.0 g. of 3-(2-methylaminoethyl) - 5 - phenyl-1,2,4-oxadiazole hydrochloride in 100 ml. of 1,2-dichlorothane and 100 ml. of aqueous 1 N sodium hydroxide solution were treated with propionyl chloride at 0°–5°. The resulting mixture was stirred and allowed to warm to room temperature, then stirring was continued for a further 1.5 hours. The layers were then separated and the aqueous layer was extracted with three 50 ml. portions of chloroform. The combined organic layers were dried and evaporated under reduced pressure. The oily residue was distilled in vacuo to yield 3-[2-(N-methylpropionamide)ethyl]-5-phenyl-1,2,4-oxadiazole of boiling point 147°–148° C./0.15 mm., and melting point 57°–59°.

In the same manner, 3 - (2 - methylaminoethyl)-5-phenyl - 1,2,4 - oxadiazole hydrochloride was treated with 2,2 - dichloroacetyl chloride to give 3-[2-(2,2 - dichloro-N-methylacetamido)ethyl]-5-phenyl - 1,2,4 - oxadiazole of melting point 101°–103° C. and with 3-chloro-propionyl chloride to give 3 - [2 - (3 - chloro-N-methylpropionamido)ethyl] - 5 - phenyl - 1,2,4 - oxadiazole of melting point 77°–78° C.

EXAMPLE 4

3 - (N - methylacetamido) - propionamidoxime was reacted with p-nitrobenzoyl chloride in the same manner as described in Example 1 to give 3 - [2 - (N - methylacetamido)ethyl] - 5 - (p-nitrophenyl) - 1,2,4 - oxadiazole of melting point 105°–109° C.

3 - [2 - (N - methylacetamido)ethyl] - 5 - (p-nitrophenyl) - 1,2,4 - oxadiazole was treated with hydrochloric acid in the same manner as described in Example 2 to give 3 - (2 - methylaminoethyl) - 5 - (p-nitrophenyl)-1,2,4 - oxadiazole hydrochloride of melting point 235°–239° C.

11.4 g. of 3 - (2 - methylaminoethyl) - 5 - (p-nitrophenyl) - 1,2,4 - oxadiazole hydrochloride in 100 ml. of 1,2 - dichloroethane and 80 ml. of aqueous 1 N sodium hydroxide solution was treated with 3.9 ml. of 2,2-dichloroacetyl chloride in a manner similar to that described in Example 3. The resulting mixture was treated in the manner described in Example 3 and the crude product obtained was recrystallized from benzene/[light petroleum (boiling range=60°–80°)] to yield 3-[2-(2,2-dichloro-N-methylacetamido)ethyl)]-5-(p - nitrophenyl)-1,2,4-oxadiazole of melting point 103°–105°.

EXAMPLE 5

3 - (N - methylacetamido) - propionamidoxime was reacted with p-chlorobenzoyl chloride in the manner described in Example 1 to give 3-[2(N-methylacetamido)ethyl] - 5 - (p-chlorophenyl) - 1,2,4 - oxadiazole of boiling point 140°–142° C./5.2×10⁻⁵ mm. and melting point 52°–56°.

3 - [2 - (N - methylacetamido)ethyl] - 5 - (p-chlorophenyl) - 1,2,4 - oxadiazole was treated with hydrochloric acid in the manner described in Example 2 to give 3-(2-methylaminoethyl) - 5 - (p-chlorophenyl) - 1,2,4 - oxadiazole hydrochloride of melting point 223°–225° C. which was treated with potassium cyanate in the manner described in Example 2 to give 3 - [2 - (N - carbamoyl-N - methylamino)ethyl] - 5 - (p - chlorophenyl) - 1,2,4-oxadiazole of melting point 136°–138°.

EXAMPLE 6

In a manner similar to that described in Example 1, (3-(N-methylacetamido)propionamidoxime was reacted:

(1) with m-nitrobenzoyl chloride to give 3 - [2 - (N-methylacetamido)ethyl] - 5 - (m - nitrophenyl) - 1,2,4-oxadiazole of melting point 98°–99°, (2) with p - dimethylaminobenzoyl chloride to give 3 - [2 - (N - methylacetamido)ethyl] - 5 - (p - dimethylaminophenyl) - 1,2,4 - oxadiazole of melting point 142°–144°, (3) with p-fluorobenzoyl chloride to give 3-[2-(N-methylacetamido)ethyl] - 5 - (p - fluorophenyl - 1,2,4-oxadiazole of melting point 89°–92°, (4) with o-chlorobenzoyl chloride to give 3-[2-(N-methylacetamido)ethyl] - 5 - (o-chlorophenyl) - 1,2,4-oxadiazole of boiling point 162°–163° C./0.1 mm. and melting point 38°–43°, (5) with o,p-dichlorobenzoyl chloride to give 3-[2-(N-methylacetamido)ethyl] - 5 - (o,p-dichlorophenyl)-1,2,4-oxadiazole of boiling point 162° C./10⁻³ mm. and melting point 84°–86°, (6) with m,p-dichlorobenzoyl chloride to give 3-[2-(N-methylacetamido)ethyl] - 5 - (m,p-dichlorophenyl)-1,2,4-oxadiazole of melting point 111°–113°, (7) with p-methoxybenzoyl chloride to give 3-[2-(N-methylacetamido)ethyl] - 5 - (p-methoxyphenyl) - 1,2,4-oxadiazole of boiling point 160° C./0.007 mm. and melting point 62°–64°, (8) with m,p-dimethoxybenzoyl chloride to give 3-[2 - (N - methylacetamido)ethyl] - 5 - (m,p-dimethoxyphenyl) - 1,2,4-oxadiazole of melting point 89°–92°.

EXAMPLE 7

3 - acetamidopropionamidoxime was prepared from 3-acetamidopropionitrile in the manner described in Example 1 and then reacted with benzoyl chloride in the manner described in Example 1. The 3 - (2 - acetamidoethyl) - 5 - phenyl - 1,2,4 - oxadiazole thus obtained had a melting point of 121°–122°.

3 - (2 - acetamidoethyl) - 5 - phenyl - 1,2,4 - oxadiazole was treated with hydrochloric acid in the manner described in Example 2, and the resulting 3-(2-aminoethyl) - 5 - phenyl - 1,2,4 - oxadiazole hydrochloride was treated with potassium cyanate in the manner described in Example 2 to give 3 - (2 - ureidoethyl)-5-phenyl - 1,2,4 - oxadiazole of melting point 154°–155°.

EXAMPLE 8

3 - acetamidopropionamidoxime was prepared from 3-acetamidopropionitrile and then reacted with p-chlorobenzoyl chloride in the manner described in Example 1. The 3 - (2 - acetamidoethyl) - 5 - (p-chlorophenyl)-1,2,4-oxadiazole, thus obtained, had a melting point of 141°–142°.

3 - (2 - acetamidoethyl) - 5 - (p - chlorophenyl)-1,2,4-oxadiazole was treated with hydrochloric acid in the manner in Example 2 to obtain 3 - (2 - aminoethyl)-5-(p - chlorophenyl) - 1,2,4 - oxadiazole hydrochloride which had a melting point of 244°–247°.

3 - (2-aminoethyl) - 5 - (p-chlorophenyl) - 1,2,4 - oxadiazole hydrochlorides was treated with potassium cyanate in the manner described in Example 2 to give 3 - (2 - ureidoethyl)-5-(p-chlorophenyl)-1,2,4-oxadiazole of melting point 152°–154°.

EXAMPLE 9

3 - (2 - aminoethyl) - 5 - (p-chlorophenyl)-1,2,4-oxadiazole hydrochloride was treated with 3-chloropropionyl chloride in the manner described in Example 3 to give 3-[2-(3-chloropropionamido)ethyl]-5-(p-chlorophenyl)-1,2,4-oxadiazole of melting point 109°–111°.

EXAMPLE 10

3-acetamidopropionamidoxime was prepared from 3-acetamidopropionitrile and then reacted with m-nitrobenzoyl chloride in the manner described in Example 1 to give (3 - (2 - acetamidoethyl)-5-(m-nitrophenyl)-1,2,4-oxadiazole of melting point 151°–152° C.

Similarly reaction:

(1) with p-nitrobenzoyl chloride gave 3-(2-acetamidoethyl) - 5 - (p-nitrophenyl)-1,2,4-oxadiazole of melting point 159–160°.

(2) with p-fluorobenzoyl chloride gave 3-(2-acetamidoethyl) - 5 - p - fluorophenyl)-1,2,4-oxadiazole of melting point 117°–118°, (3) with m-chlorobenzoyl chloride to give 3-(2-acetamidoethyl) - 5 - (m-chlorophenyl)-1,2,4-oxadiazole of melting point 109°–110° C., and (4) with p-methoxybenzoyl chloride to give 3-(2-acetamidoethyl)-5-(p-methoxyphenyl-1,2,4-oxadiazole of melting point 137°–138° C.

EXAMPLE 11

3 - (N - ethylacetamido)propionamidoxime of melting point 110–113°, was obtained from 3-(N-ethylacetamido) propionitrile in the manner described in Example .

33.6 g. of 3-(N-ethylacetamido)propionamidoxime were reacted with 37.1 g. of m-nitrobenzoyl chloride in 100 ml. of dry pyridine in the manner described in Example 1. Crystallization of the reaction product from benzene/light petroleum (boiling range=60°–80° C.)] yield 3 - [2 - (N - ethylacetamido)ethyl] - 5-m-nitrophenyl)-1,2,4-oxidiazole of melting point 77°–78°.

In the manner described in Example 1, 3-(N-ethylacetamido)propionamidoxime was reacted:

(1) with benzoyl chloride to give 3-[2-N-ethylacetamido)ethyl]-5-phenyl-1,2,4-oxadiazole of boiling point 159° C./0.1 mm. and melting point 42°–44°, (2) with p-nitrobenzoyl chloride to give 3-[2-(N-ethylacetamido)ethyl] - 5 - (p - nitrophenyl)-1,2,4-oxadiazole of melting point 90°–92°, (3) with m-chlorobenzoyl chloride to give 3-[2-(N-ethylacetamido)ethyl] - 5 - (m - chlorophenyl)-1,2,4-oxadiazole of boiling point 140° C./$10^{-4}$ mm., (4) with p-chlorobenzoyl chloride to give 3-[2-(N-ethylacetamido)ethyl] - 5 - (p - chlorophenyl)-1,2,4-oxadiazole of melting point 74°–77°, and (5) with p-methoxybenzoyl chloride to give 3-[2-(N-ethylacetamido)ethyl] - 5 - (p - methoxyphenyl)-1,2,4-oxadiazole of melting point 70°–72°.

EXAMPLE 12

3 - (N-propylacetamido)propionamidoxime of melting point 91°–92° was obtained from 3-(N-propylacetamido) propionitrile in the manner described in Example 1.

In the manner described in Example 1, 3-(N-propylacetamido)propionamidoxime was reacted:

(1) with benzoyl chloride to give 3-[2-(N-propylacetamido)ethyl]-5-phenyl-1,2,4-oxadiazole of boiling point 164° C./0.15 mm. and melting point 44°–49°, and (2) with p-chlorobenzoyl chloride to give 3-[2-(N-propylacetamido)ethyl] - 5 - (p-chlorophenyl) - 1,2,4-oxadiazole of boiling point 154°–158° C./$10^{-3}$–$10^{-4}$ mm. and melting point 59°–61°.

EXAMPLE 13

3-(N-isopropylacetamido)propionamidoxime of melting point 91°–94° was obtained from 3-(N-isopropylacetamido)propionitrile in the manner described in Example 1.

In the manner described in Example 1, 3-(N-isopropylacetamido)propionamidoxime was reacted:

(1) with benzoyl chloride to give 3-[2-(N-isopropylacetamido)ethyl - 5 - (p - chlorophenyl)-1,2,4-oxadiazole, and (2) with p-chlorobenzoyl chloride to give 3-[2-(N-isopropylacetamido)ethyl] - 5 - (p-chlorophenyl)-1,2,4-oxadiazole.

EXAMPLE 14

3 - (N - allylacetamido)propionamidoxime of melting point 81°–82° was obtained from 3-N-allylacetamido)propionitrile in the manner described in Example 1.

37.0 g. of 3-(N-allylacetamido)propionamidoxime were reacted with 18.28 ml. of benzoyl chloride in 100 ml. of dry pyridine in the manner described in Example 1. Distillation of the reaction product in vacuo gave 3-[2-(N-allylacetamido) ethyl]-5-phenyl-1,2,4-oxadiazole of boiling point 180° C./0.2 mm. and melting point 41°–42°.

In the manner described in Example 1, 3-(N-allylacetamido)propionamidoxime was also reacted with p-chlorobenzoyl chloride to give 3-[2-(N-allylacetamido) ethyl] - 5 - (p-chlorophenyl)-1,2,4-oxadiazole of melting point 55.5°–56.5°.

EXAMPLE 15

Tablets each containing 50 mg. of 3-[2-(N-methylacetamido)ethyl] - 5 - (m-chlorophenyl)-1,2,4-oxadiazole, 125 mg. of corn starch, 270 mg. of calcium phosphate and 1 mg. of magnesium stearate and each having a total weight of 446 mg., were obtained by thoroughly mixing the ingredients, compressing the mixture into tablet slugs, breaking the tablet slugs into granules and compressing the granules into tablets each containing 50 mg. of the active ingredient; such tablets may be scored if desired.

EXAMPLE 16

Capsules each containing 25 mg. of 3-[2-(N-methylacetamido) - ethyl]-5-(m-chlorophenyl)-1,2,4-oxadiazole, 155 mg. of lactose, 30 mg. of corn starch and 5 mg. of talc and each having a total net weight of 215 mg. were obtained by thoroughly blending the ingredients and filling the resulting blended powder into suitable two-piece hard gelatin capsules on a capsulating machine.

We claim:

1. A compound of the formula

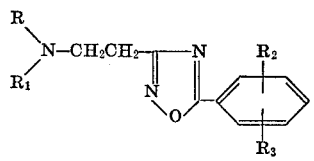

wherein R is selected from the group consisting of lower alkyl and lower alkenyl, $R_1$ represents lower alkanoyl, halo-lower alkanoyl, dihalo-lower alkanoyl or aminocarbonyl and $R_2$ and $R_3$ are each selected from the group consisting of hydrogen, halogen, nitro, lower alkyl, lower alkoxy and di(lower alkyl)amino.

2. A compound as in claim 1 wherein R is lower alkyl and the lower alkyl group is selected from the group consisting of methyl and ethyl.

3. A compound as in claim 1 wherein $R_2$ is hydrogen and $R_3$ is selected from the group consisting of hydrogen and halogen.

4. A compound as in claim 3 wherein R is lower alkyl, i.e., a compound of the formulae

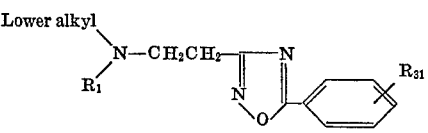

wherein $R_1$ is selected from the group consisting of lower alkanoyl, halo-lower alkanoyl, dihalo-lower alkanoyl and aminocarbonyl and $R_{31}$ is selected from the group consisting of hydrogen and halogen.

5. A compound as in claim 4 wherein the lower alkyl group is selected from the methyl and ethyl lower alkyl groups.

6. A compound as in claim 4 wherein $R_1$ is lower alkanoyl.

7. A compound as in claim 6 wherein $R_{31}$ is halo and is joined to the phenyl ring in the meta position, i.e., a compound of the formula 3-[2-(N-lower alkyl-N-lower alkanoyl)-aminoethyl] - 5 - (m-halophenyl)-1,2,4-oxadiazole.

8. A compound as in claim 7 wherein the lower alkyl group is methyl, the halo group is chlorine and the lower alkanoyl group is acetyl, i.e. a compound of the formula 3 - [2 - (N-methyl-acetamido)ethyl]-5-(m-chlorophenyl)-1,2,4-oxadiazole.

References Cited

UNITED STATES PATENTS

| | | | |
|---|---|---|---|
| 2,897,079 | 7/1959 | De Cat et al. | 96—55 |
| 3,141,019 | 7/1964 | Palazzo et al. | 260—247.5 |
| 3,227,725 | 1/1966 | Eloy et al. | 260—307 |
| 3,270,029 | 8/1966 | Palazzo | 260—307 |

OTHER REFERENCES

Goncalves et al.: Compt. Rend. 259 (II), 1819–21 (1964).

ALEX MAZEL, Primary Examiner

R. V. RUSH, Assistant Examiner

U.S. Cl. X.R.

260—465.4, 561 R, 561 N, 562 R; 424—272